Jan. 19, 1965     D. C. WORLTON     3,165,922
METHOD OF APPLYING LAMB WAVES IN ULTRASONIC TESTING
Filed April 16, 1962     2 Sheets-Sheet 1
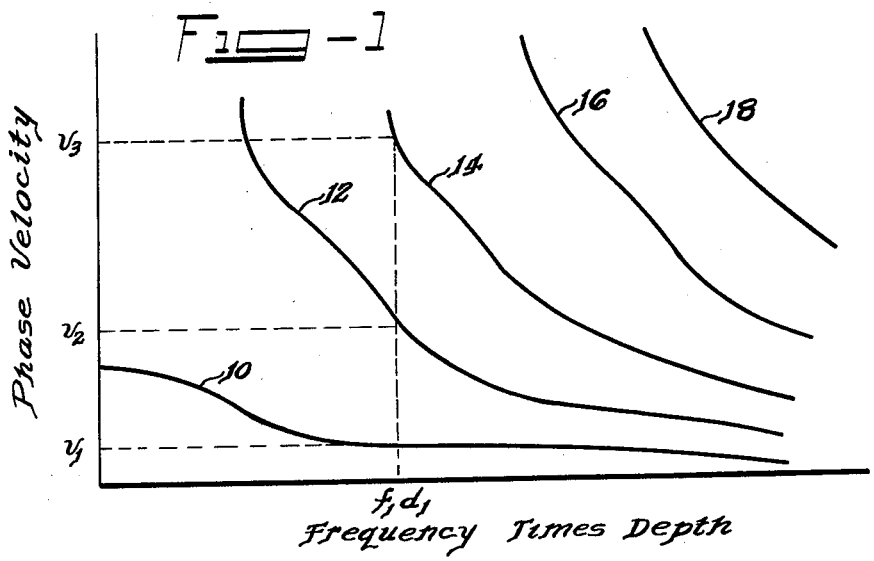
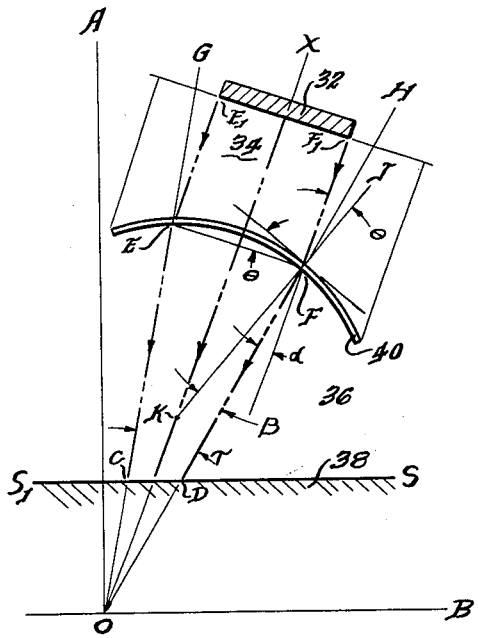
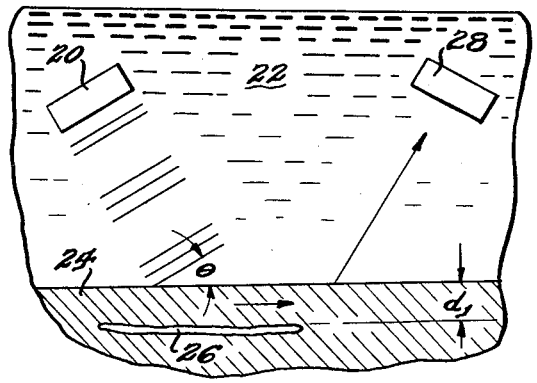
INVENTOR.
Daniel C. Worlton
BY
Richard Q. Anderson
Attorney

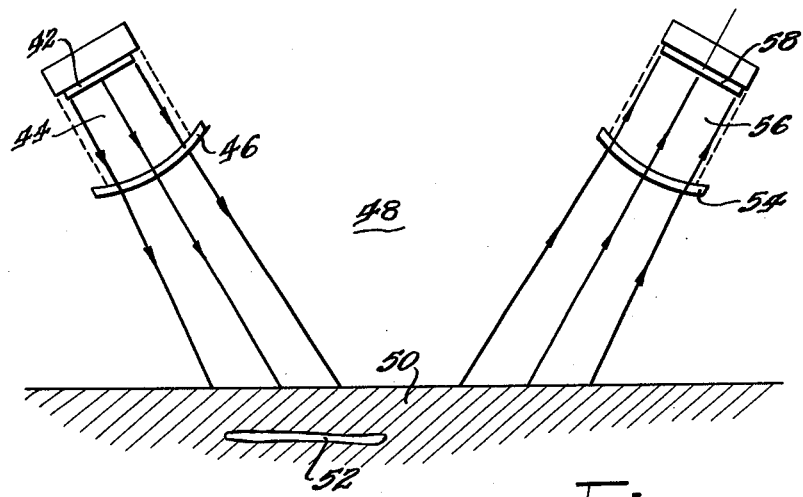
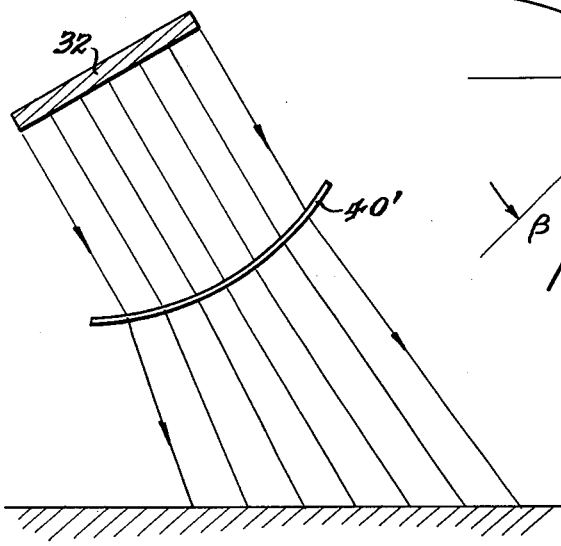
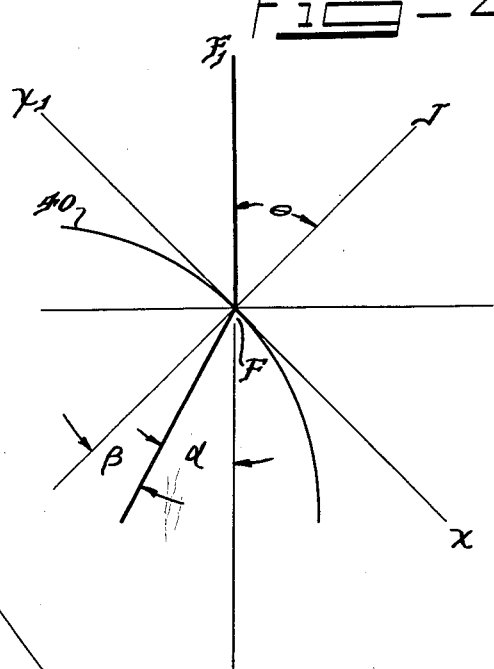

3,165,922
METHOD OF APPLYING LAMB WAVES IN ULTRASONIC TESTING
Daniel C. Worlton, Richland, Wash., assignor to the United States of America as represented by the United States Atomic Energy Commission
Filed Apr. 16, 1962, Ser. No. 187,995
7 Claims. (Cl. 73—67.7)

This invention relates to nondestructive methods of detecting subsurface flaws in a metal plate and more particularly to methods using Lamb waves to detect subsurface flaws in a metal sample.

In U.S. Patent 2,536,128, Firestone and Ling disclose methods and means by which Lamb waves may be generated in plates. Further, they teach that such Lamb waves may be used in detecting a subsurface flaw in the metal plate. However, as taught by Firestone and Ling, the presence or absence of a flaw can only be determined at a single predetermined depth in the plate. Thus, if a flaw occurs at any depth other than that being tested, the flaw will pass undetected. This method is obviously unsuitable for production testing where it is necessary to detect any subsurface flaws in the metal sample.

It is therefore one object of the present invention to provide a method for nondestructively detecting subsurface flaws occurring at varying depths in a metal sample.

It is another object of the present invention to provide a method using Lamb waves for detecting subsurface flaws occurring at varying depths in a metal sample.

Other objects of the present invention will become more apparent as the detailed description proceeds.

In general, the present invention comprises generating ultrasonic plane waves at a predetermined frequency. The ultrasonic plane waves are transmitted through two mediums having different ultrasonic velocities and impinge on the surface of a metal sample. The two mediums are separated by an interfacing which is shaped to provide the impinging ultrasonic waves with a spectrum of angles of incidence. Subsurface flaws in the metal sample will cause Lamb wave modes to be excited therein dependent upon the depth of the flaws, and the frequency and incident angle of the ultrasonic waves. The excited Lamb waves travel along the sample at a phase velocity equal to the surface velocity of the exciting plane wave, radiating ultrasonic waves at an angle of exit equal to the angle of incidence of the exciting ultrasonic waves. The radiated waves are passed through two mediums similar to those used with the transmitted waves, which mediums also are separated by an interfacing shaped to refract the radiated waves so that they may be detected by a receiving crystal and denote the presence of a subsurface flaw.

More complete understanding of the invention will best be obtained from consideration of the accompanying drawings in which:

FIGURE 1 is a graphical representation of Lamb wave modes in aluminum plate as a function of phase velocity versus the product of frequency and depth of a flaw in the plate.

FIGURE 2 is a sketch illustrating an apparatus for generating Lamb wave modes in a sample.

FIGURE 3 illustrates the geometrical construction of a convergent test head for the practice of the present invention.

FIGURE 4 is a sketch illustrating further geometrical construction for the device of FIGURE 3.

FIGURE 5 illustrates a divergent test head for the practice of the present invention.

FIGURE 6 illustrates an apparatus for the practice of the present invention using divergent test heads.

When an ultrasonic wave impinges on a metal plate having a flaw therein, an infinite number of Lamb wave modes of vibration may be generated within the region between the surface of the plate and the flaw, depending upon the material of the plate, the depth of the flaw in the plate and the frequency of the ultrasonic wave. Each Lamb wave mode is propagated with a unique phase velocity that is related to the product of the frequency of the ultrasonic wave and the depth of the flaw in the plate. FIGURE 1 illustrates this relationship for aluminum plate. In FIGURE 1, curves 10, 12, 14, 16 and 18 are plots of the first, second, third, fourth and fifth symmetrical modes respectively. Thus, where a flaw is situated in an aluminum plate at a depth $d_1$ and an ultrasonic wave of frequency $f_1$ is applied to the plate, the product $f_1 d_1$ will permit the excitation of the first, second, or third Lamb wave modes in the region between the flaw and the metal surface. The corresponding phase velocities of the excited Lamb waves will be $V_1$, $V_2$, or $V_3$ as shown in FIGURE 1.

The transducer arrangement of FIGURE 2 is a conventional means for generating Lamb wave modes in a sample. A transmitting transducer 20 immersed in a water coupling medium 22 generates ultrasonic plane waves which travel through the medium 22 and impinge on the surface of a sample 24 at a predetermined angle $\theta$. The point of contact between a plane wave front and the sample 24 runs along the surface of the sample 24 with a velocity V. The velocity V is equal to $$\frac{V_w}{\sin \theta}$$

where $V_w$ is the velocity of the ultrasound in the coupling medium 22 and $\theta$ is the angle of incidence of the ultrasonic wave. When the incident angle $\theta$ is chosen so that the surface velocity V is equal to the phase velocity of a particular Lamb wave mode, then that particular Lamb wave mode will be excited in the sample 24 in the region between the surface thereof and the flaw 26, provided that the frequency times depth of the flaw 26 therefor is correct. Once the Lamb wave is excited in the sample 24, it will travel along the length of the sample 24 radiating energy therefrom into the coupling medium 22 at an exit angle equal to the incident angle $\theta$. The receiving transducer 28 is aligned to detect the radiated energy from the sample 24 and hence the presence of flaw 26.

As recited supra, a given Lamb wave mode is propagated within the sample 24 only upon condition that the incident plane wave angle $\theta$, depth of the flaw 26, and frequency of the plane wave satisfy the requirements set forth by the curves shown in FIGURE 1. Thus, for a flaw depth of $d_1$ and an ultrasonic wave frequency $f_1$, a value of $\theta$ making V equal to $V_1$ will generate the first Lamb wave mode, a value of $\theta$ making V equal $V_2$ will generate the second mode, and so on. Subsurface flaws may be detected therefore at any depth in a metal sample by impinging on the sample 24 ultrasonic waves having a single fixed frequency and a spectrum of angles of incidence.

Referring now to FIGURE 3, there is illustrated a means for achieving a spectrum of incident angles. A transducer 32 generates ultrasonic waves which are caused to flow through two coupling mediums 34 and 36 before impinging on a test sample 38. The two mediums 34 and 36 have different ultrasonic velocities $V_4$ and $V_6$ respectively. An interfacing 40 is disposed between the two mediums 34 and 36 thereby separating them and is so shaped as to cause a bending of the waves to give the desired incident angles at the surface of the sample 38.

FIGURE 4 illustrates the geometry whereby an equation is derived from which the curvature of the interface 40 may be computed. An axis of reference is taken along the path of the incident wave $F_1F$ as shown and a tangent $X_1X$ to the interface 40 is drawn at the point F where the wave $F_1F$ contacts the interface 40. Let $\theta$ be the angle between the wave $F_1F$ and the normal JF to the tangent line $X_1X$, and $\alpha$ be the angle through which the wave $F_1F$ is bent as it traverses the interface 40.

Therefore $$\theta = \alpha + \beta \tag{1}$$

From Snell's Law $$\frac{\sin \theta}{\sin \beta} = \frac{V_4}{V_6} = \frac{1}{K}$$

$$\sin \beta = K \sin \theta \tag{2}$$

From (1)

$$\sin \theta = \sin(\alpha + \beta) = \sin \alpha \cos \beta + \cos \alpha \sin \beta \tag{3}$$

substituting (2) into (3) and simplifying, $$\sin \theta = \frac{\sin \alpha}{\sqrt{K^2 - 2K \cos \alpha + 1}} \tag{4}$$

Using Equation 4, the construction of the test head shown in FIGURE 3 and described above is accomplished as follows. Mutually perpindicular reference lines OA and OB are constructed. Let OX, the medium wave of transducer 32, be undeflected as it traverses the interface 40. The angular value of OX is chosen corresponding to the Lamb wave mode desired at the frequency and sample 38 thickness in question. OX is constructed at this angle with respect to OB.

Let OH and OG be the extreme waves incident to the sample 38 and $\tau$ be the angular range therebetween. OH and OG are then drawn so that OX bisects the angle $\tau$. The surface of the sample 38 represented by line $S_1S$ is drawn at a point along OX so that the extreme waves OH and OG are separated along $S_1S$ the desired amount (line CD). Thus, the angles with which OG, OX and OH contact the line $S_1S$ represent the maximum, medium, and minimum angles with which the waves strike the surface of sample 38.

Line OX is then intersected by line EF perpendicular thereto at a point along OX where the distance from E (where the line EF intersects OG) to the point F (where the line EF intersects OH) is equal to the width of the undeflected waves from transducer 32. This value (distance EF) is determined by the width of the transducer 32. The transducer 32 is then located along the line GH where GH is parallel to EF, and the midpoint of the transducer 32 is on line OX.

Lines $E_1E$ and $F_1F$ are then drawn parallel to OX and represent the extreme undeflected waves from transducer 32. Angle $\alpha$ is then measured and angle $\theta$ is computed from Equation 4 recited supra. Line JF is then constructed at the computed angle $\theta$ and the extension of line JF intersects line OX at a point K. A circle is then scribed using KF as radius and K as the center thereof. The resulting curve of the circle gives the correct curvature of the surface of interface 40 to converge the ultrasonic waves such that they strike the surface of the sample 38 with the desired angles of incidence. The greater the curvature of the interface 40, the greater the ultrasonic waves are converged at the surface of sample 38. It is to be understood that the described technique is equally applicable to a diverging system, and the shape of interfacing 40' therefor and wave diffraction is shown in FIGURE 5.

In a two transducer system as described for FIGURE 2, where separate transmitting and receiving transducers are required, two identical test heads would be required of either the converging or diverging type described above.

FIGURE 6 illustrates an embodiment using the principles of the present invention. The transmitting transducer 42 generates ultrasonic plane waves which are passed unrefracted through a silicon oil medium 44. The ultarsonic waves are then passed through a diaphragm interface 46 and a water medium 48 whereby they are refracted to give a divergent spectrum before striking the surface of a sample 50. Lamb waves will be excited in the test sample 50 in the region between the surface thereof and the flaw 52. The Lamb waves travel along the sample 50 radiating energy therefrom into the water medium 48. The radiated waves are then passed through interface 54 which is identical to interface 46 and through a silicon oil medium 56 whereby the radiated waves are refracted to give parallel waves which are detected by receiving transducer 58. Thus, the presence of a flaw 52 in sample 50 may be detected regardless of the depth at which it occurs in the sample 50. It is to be understood that mediums other than those described above may be used.

Persons skilled in the art will, of course, adapt the teachings of the invention to methods far different than those illustrated. Accordingly, the scope of protection afforded the invention should not be limited to the methods shown in the drawings and described above, but should be determined only in accordance with the appended claims.

What is claimed is:

1. A method of detecting subsurface flaws in a metal sample comprising the steps of generating ultrasonic plane waves, refracting said ultrasonic waves to generate a spectrum of angles therein, causing said refracted ultrasonic waves to impinge on the surface of said sample, said refracted ultrasonic waves exciting Lamb wave modes within said sample in the presence of subsurface flaws therein, and detecting the excited Lamb wave modes, whereby the presence of said flaws is detected.

2. The method according to claim 1 wherein said ultrasonic waves are refracted to generate a divergent spectrum of angles therein.

3. The method according to claim 1 wherein said ultrasonic waves are refracted to generate a convergent spectrum of angles therein.

4. A method of detecting subsurface flaws in a metal sample comprising the steps of generating ultrasonic plane waves, refracting said ultrasonic waves to generate a spectrum of angles therein, causing said refracted ultrasonic waves to impinge on the surface of said sample, said refracted ultrasonic waves exciting Lamb wave modes within said sample in the presence of subsurface flaws therein, said excited Lamb wave modes travelling along said sample radiating ultrasonic waves therefrom at an angle of exit equal to the angle of incidence of the exciting ultrasonic waves, refracting said radiated ultrasonic waves to give essentially parallel ultrasonic waves and detecting said refracted-radiated ultrasonic waves, whereby subsurface flaws are detected.

5. A method of detecting subsurface flaws in a metal sample comprising the steps of generating ultrasonic plane waves, causing said ultrasonic waves to flow through two mediums of different ultrasonic velocities, and to impinge on the surface of said sample, said two mediums being separated by an interfacing shaped to provide said impinging ultrasonic waves with a predetermined spectrum of angles of incidence at the surface of said sample, said ultrasonic waves exciting Lamb wave modes within said sample in the presence of subsurface flaws therein, and detecting the excited Lamb wave modes, whereby the presence of said flaws is detected.

6. The method according to claim 5 wherein said ultrasonic waves are generated at a single predetermined frequency.

7. A method of detecting subsurface flaws in a metal sample comprising the steps of generating ultrasonic plane waves at a predetermined fixed frequency, causing said ultrasonic waves to flow through first and second mediums having different ultrasonic velocities and to impinge on the surface of said sample, said first and second mediums being separated by a first interfacing shaped to provide said impinging ultrasonic waves with a predetermined spectrum of angles of incidence at the surface of said sample, said ultrasonic waves exciting Lamb wave modes within said sample in the presence of subsurface flaws therein, said excited Lamb wave modes travelling along said sample radiating ultrasonic waves therefrom at an angle of exit equal to the angle of incidence of the exciting ultrasonic waves, causing said radiated ultrasonic waves to pass through said first medium and through a third medium identical to said second medium, said first and third mediums being separated by a second interfacing identical to said first interfacing, and detecting said radiated ultrasonic waves as they pass through said third medium, whereby subsurface flaws are detected.

References Cited by the Examiner
UNITED STATES PATENTS

| | | | |
|---|---|---|---|
| 2,536,128 | 1/51 | Firestone et al. | 73—67.8 |
| 2,848,890 | 8/58 | Sheldon | 73—67.5 |
| 2,995,925 | 8/61 | Worlton | 73—67.7 |
| 3,028,752 | 4/62 | Bacon | 73—67.8 |

OTHER REFERENCES

AEC Report H. W. 60662, "Lamb Waves at Ultrasonic Frequencies," by D. C. Worlton. Published June 9, 1959. 62 pages.

RICHARD C. QUEISSER, *Primary Examiner.*
ROBERT L. EVANS, *Examiner.*